United States Patent [19]
Margison

[11] Patent Number: 4,481,831
[45] Date of Patent: Nov. 13, 1984

[54] FLUENT SOLID MATERIAL FLOW TRANSDUCER

[75] Inventor: Elwood R. Margison, Downers Grove, Ill.

[73] Assignee: United Conveyor Corporation, Deerfield, Ill.

[21] Appl. No.: 485,223

[22] Filed: Apr. 13, 1983

[51] Int. Cl.³ .............................................. G01F 1/30
[52] U.S. Cl. .............................. 73/861.73; 73/862.58
[58] Field of Search ........... 73/861.71, 861.73, 861.74, 73/861.75, 862.58

[56] References Cited

U.S. PATENT DOCUMENTS

| | | |
|---|---|---|
| 2,561,763 | 7/1951 | Waters et al. |
| 2,677,385 | 5/1954 | Markson . |
| 2,742,784 | 4/1956 | Brous ............................... 73/861.74 |
| 3,212,330 | 10/1965 | De Pollier ........................ 73/861.73 |
| 3,232,486 | 2/1966 | Ofner . |
| 3,530,714 | 9/1970 | Akeley ............................. 73/861.75 |
| 3,557,616 | 1/1971 | Landon, Jr. et al. . |
| 4,067,238 | 1/1978 | Detiker ............................ 73/861.73 |

Primary Examiner—Charles A. Ruehl
Attorney, Agent, or Firm—Wood, Dalton, Phillips, Mason & Rowe

[57] ABSTRACT

A pulverulent material flow transducer has a frame that mounts on the exterior of a conduit in a pulverulent material transporting system. A load cell in the frame includes a sealed chamber one side of which is formed by a resilient control diaphragm, and communicating with the chamber are an air inlet pipe for admitting air at a constant pressure to the chamber, an air outlet pipe, and a bleed nozzle the inner end of which is so related to the control diaphragm as to provide an orifice for the bleed nozzle the area of which is varied by movement of the control diaphragm. A sensor member pivoted in a sealed hole in the conduit has a sensing arm to sense the volume of material flowing through the conduit and a force arm which acts through a guided piston rod and piston to move the control diaphragm and thus vary the bleed nozzle orifice in proportion to the volume of material passing through the conduit. This provides variable air pressure in the air outlet pipe which may be used for any desired measuring or control function; for example, controlling the position of a feed valve that controls the volume of material entering the conduit.

20 Claims, 8 Drawing Figures

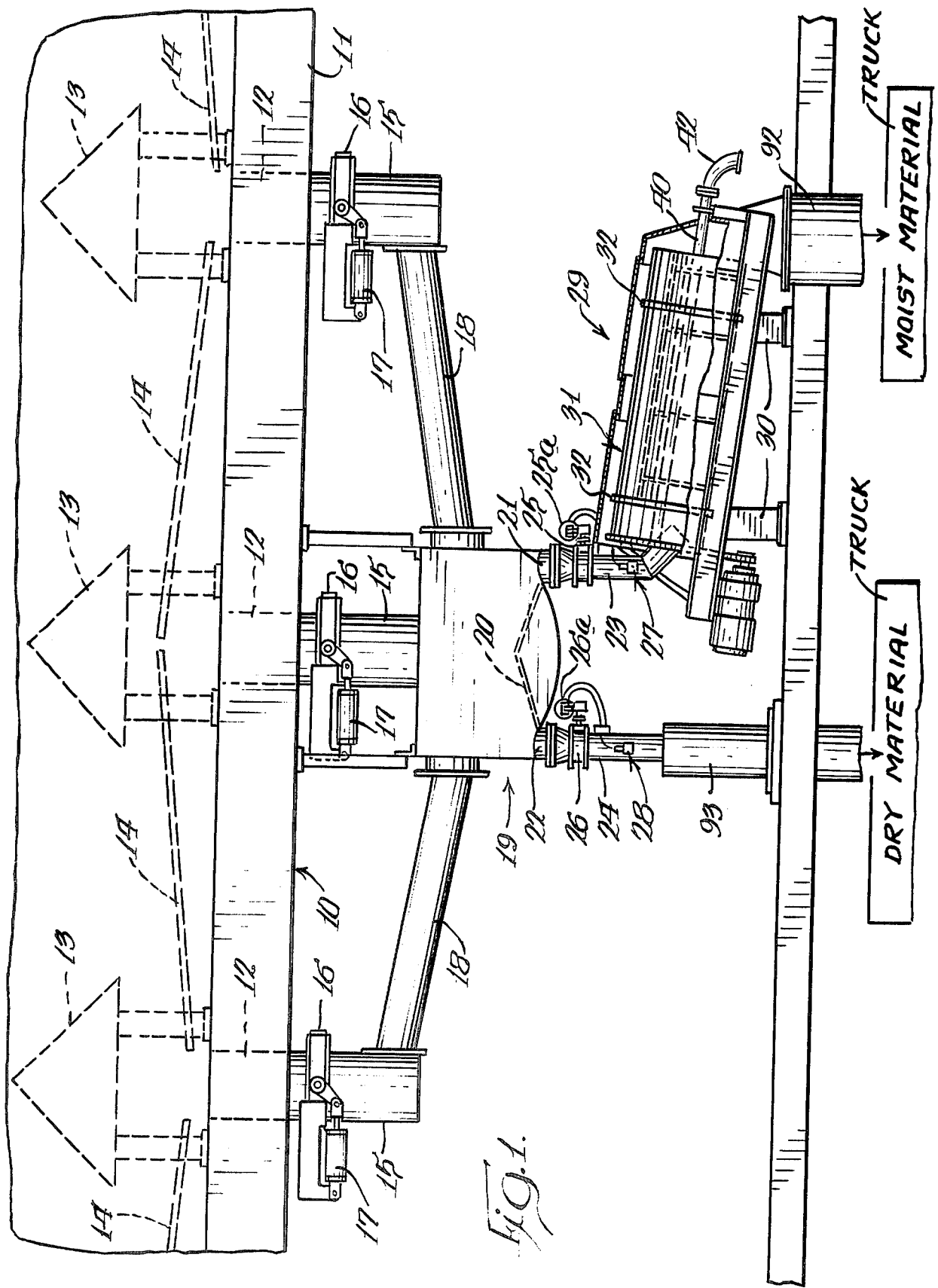

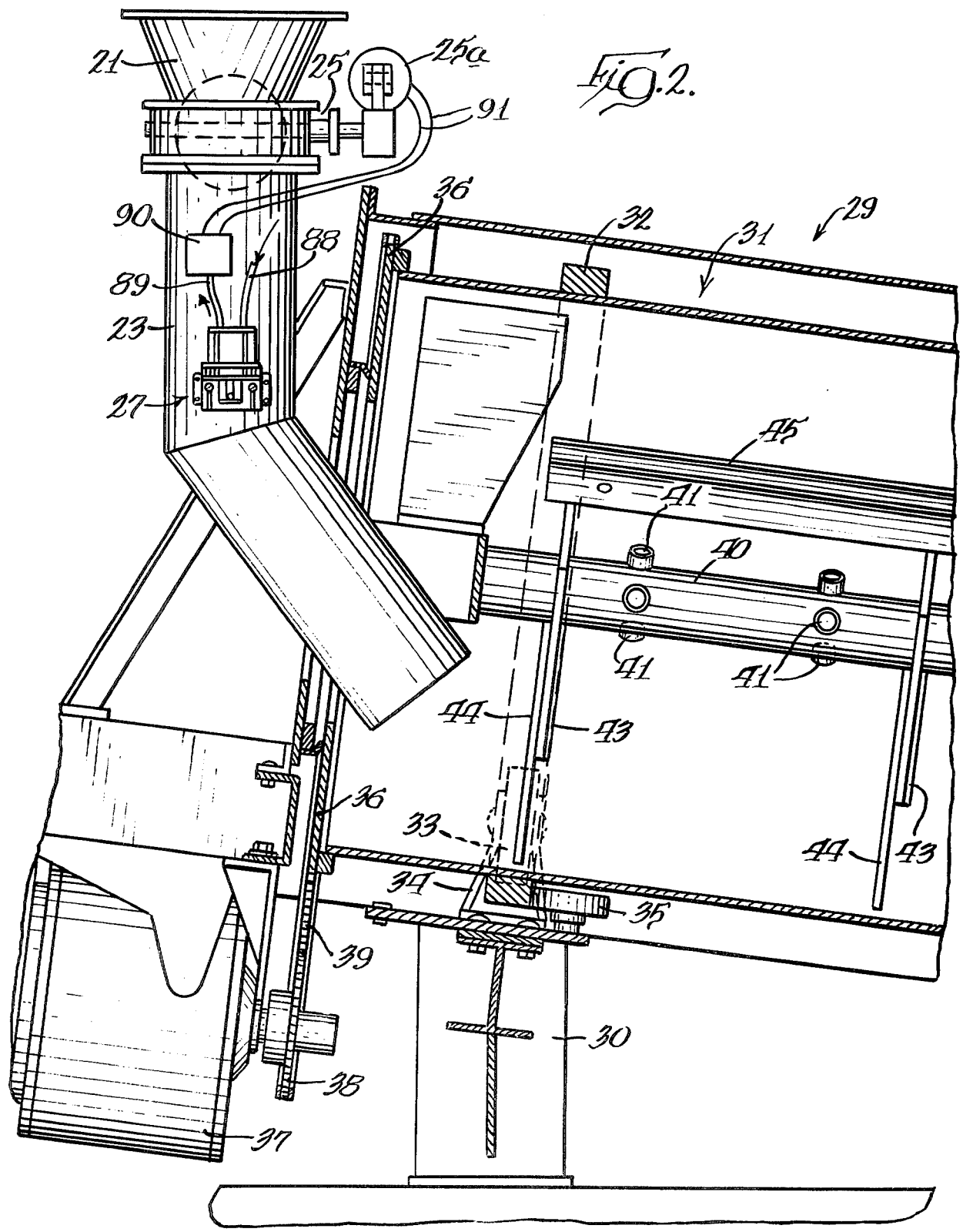

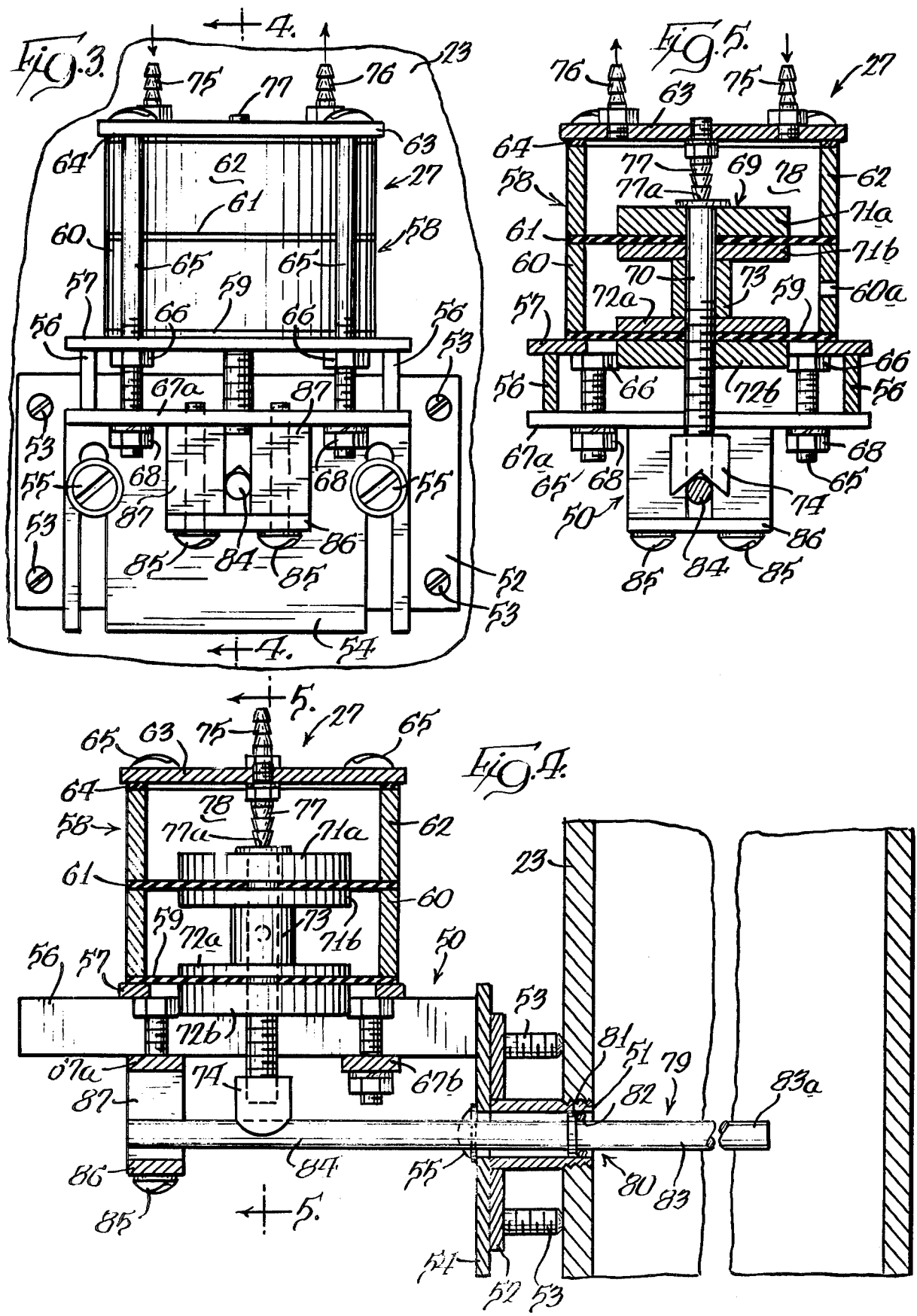

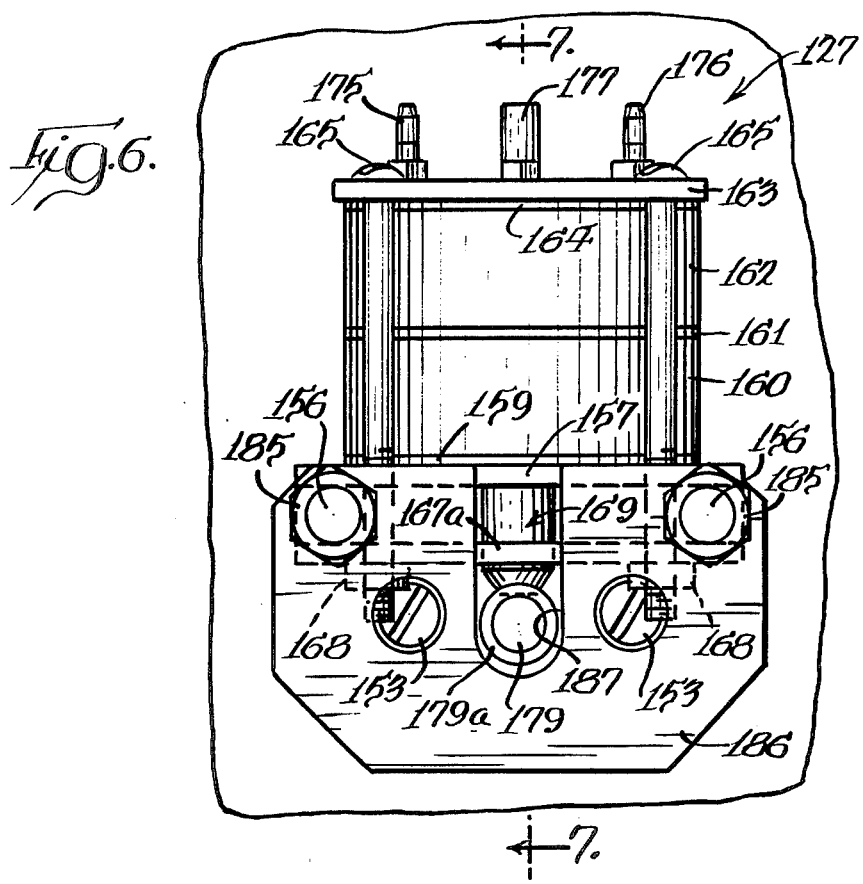
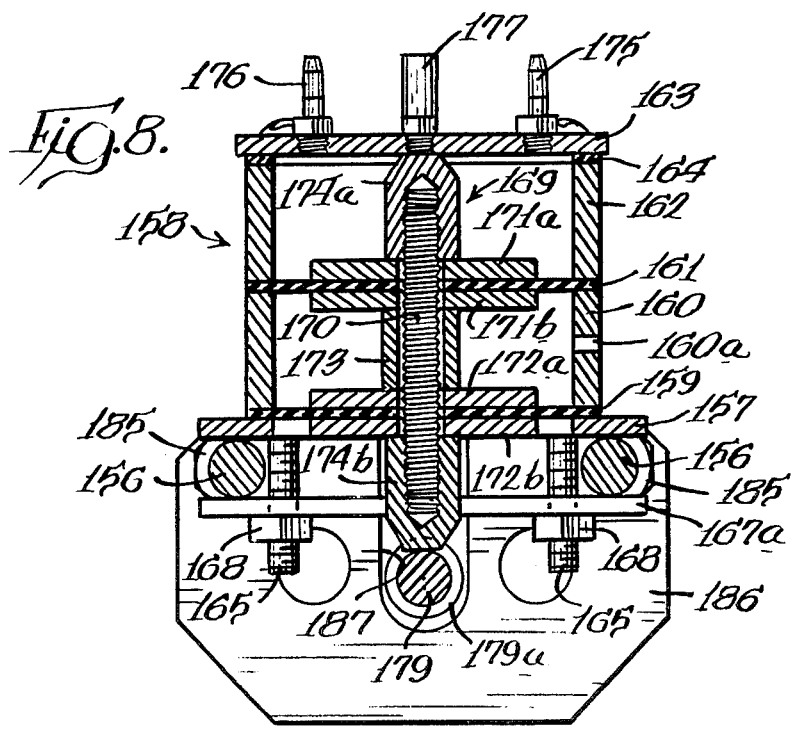

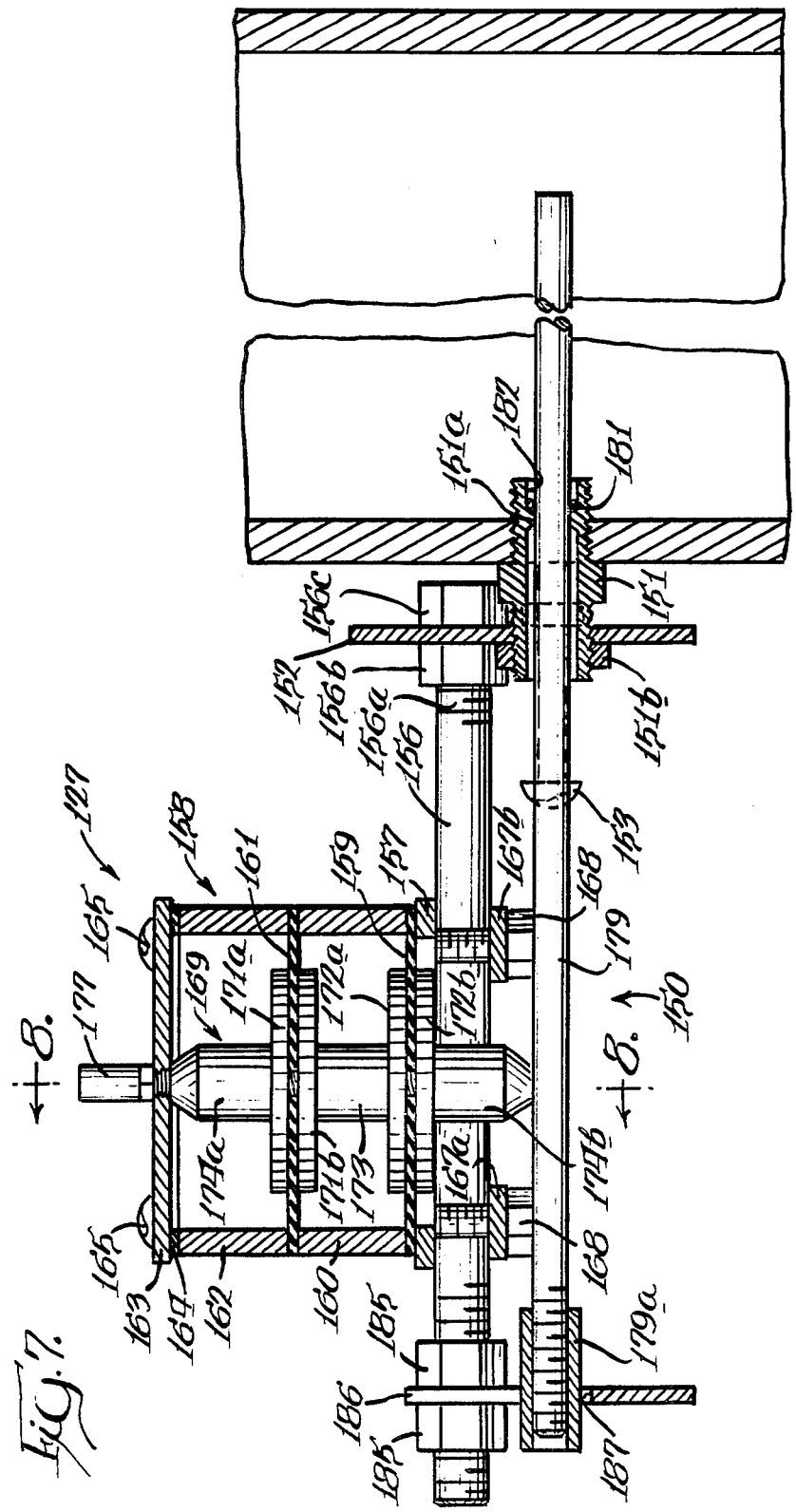

FLUENT SOLID MATERIAL FLOW TRANSDUCER

CROSS REFERENCE TO RELATED APPLICATION

The material handling system which is described in detail in the present application is claimed in applicant's copending U.S. patent application Ser. No. 485,222, filed Apr. 13, 1983, titled Fluent Solid Material Handling System.

BACKGROUND OF THE INVENTION

"Fluent solid material" is used herein as a generic term to include pulverulent or granular material which is capable of flowing freely, either in an unassisted gravity system or in aerated or liquid slurry form.

There are a number of industrial applications in which it is very desirable to have a simple and reliable transducer which is capable of measuring the rate of flow of fluid solid material through a duct and feeding a flow rate signal to a control or recording device. One such industrial application is in systems for handling pulverulent material, such as fly ash, which has been collected in a hopper. Applicant's above-referenced copending U.S. patent application, which contains the same drawings and detailed description as the present application, claims such a system.

Patents known to applicant and his attorney which are most pertinent to the present system include U.S. Pat. Nos. 2,561,763; 2,677,385; 3,232,486; and 3,557,616.

SUMMARY OF THE INVENTION

In accordance with the present invention a fluent solid material flow transducer has a frame adapted to be mounted on the exterior of an upright conduit in a fluent solid material transporting system. A load cell in the frame comprises a sealed chamber, one side of which is defined by a resilient control diaphragm, with a piston for applying force to the control diaphragm, an air inlet pipe for admitting air at a constant flow rate to the chamber, an air outlet pipe communicating with the interior of the chamber, and a bleed nozzle that has an inner end immediately adjacent the inner surface of the control diaphragm to provide an orifice for the bleed nozzle the area of which is varied by movement of the control diaphragm. A substantially friction free sealed pivot is secured to the frame in a hole in the conduit, and a sensor member mounted on the pivot has a sensing arm that extends into the conduit and a force arm for moving the piston. The relationship between the bleed nozzle and the control diaphragm is such that when no material is passing through the conduit, air from the sealed chamber bleeds freely to atmosphere; while the impact of material on the sensing arm causes the force arm to move the piston and control diaphragm to vary the bleed nozzle orifice in proportion to the volume of material passing through the conduit and thus vary the pressure of air in the air outlet pipe.

The varying air pressure in the air outlet pipe may be used for any desired measuring or control function. For example, as described in the present specification the transducer controls the position of a feed valve that controls the volume of air borne pulverulent material entering a conduit.

THE DRAWINGS

FIG. 1 is a fragmentary side elevational view of a pulverulent material handling system which utilizes two pulverulent material flow transducers in accordance with the present invention;

FIG. 2 is a fragmentary sectional view on an enlarged scale showing a feed conduit, a feed valve, one end of a moistening chamber, and the material flow transducer;

FIG. 3 is an elevational view of a prototype of the fluent solid material flow transducer of the present invention;

FIG. 4 is a fragmentary sectional view taken substantially as indicated along the line 4—4 of FIG. 3;

FIG. 5 is a sectional view taken substantially as indicated along the line 5—5 of FIG. 4;

FIG. 6 is an elevational view of a production model of the transducer;

FIG. 7 is a fragmentary sectional view taken substantially as indicated along the line 7—7 of FIG. 6; and FIG. 8 is a sectional view taken substantially as indicated along the line 8—8 of FIG. 7.

DETAILED DESCRIPTION OF THE INVENTION

Referring to the drawings in detail, and referring first to FIG. 1, a preferred embodiment of the invention used for dry pulverulent material such as fly ash includes a material collecting hopper, indicated generally at 10, which has a heavy floor 11 provided with several discharge openings 12. Above each discharge opening is a conical baffle 13, and aerating conveyors 14, which are preferably inclined, assist in moving dry, pulverulent material such as fly ash into discharge ducts 15, each of which is provided with a control valve arrangement 16 that is operated by an air cylinder 17 to close and open the valves 16 for selectively admitting material to the ducts 15. At the lower end of each of the ducts 15 is a transfer duct 18 which communicates with the interior of a transfer hopper, indicated generally at 19. The bottom of the illustrated transfer hopper is provided with two oppositely inclined material aerating floors 20 which lead to a first bottom outlet 21 and a second bottom outlet 22. However, in various systems a hopper with a single central bottom outlet may be used with a suitably arranged aerating floor; or there may be more than two outlets and an appropriate aerating floor or floors.

Connected to the first bottom outlet 21 is a feed conduit 23; and connected to the second bottom outlet 22 is a feed bypass conduit 24. A feed valve 25 operated by a power unit 25a controls flow of material into the feed conduit 23, and a feed bypass valve 26 operated by a power unit 26a controls movement of material into the bypass conduit 24.

A fluent solid material flow transducer, indicated generally at 27, controls the position of the feed valve 25 as will be described in detail hereinafter; and an identical material flow transducer, indicated generally at 28, controls the position of the bypass feed valve 26.

The valves 16, 25 and 26 may be of any of the kinds commonly used to control the flow of material in a pulverulent material handling system, and as seen in FIG. 2 the feed valve 25 is a butterfly valve.

Also, as is customary in such systems, there is an electropneumatic or electrohydraulic control for opening and closing the valves 16, either in accordance with a sensor in the transfer hopper 19, or on a timed cycle. The controls also include conventional means for locking out control of the feed valve 25 and the feed bypass valve 26 by the respective transducers 27 and 28, so that when desired all the material may pass through the feed conduit 23 or through the feed bypass conduit 24.

The system includes a moistening chamber, indicated generally at 29, which has supports 30 that carry an axially rotatable tumbling drum, indicated generally at 31, which has circumferential drive bands 32 that are carried upon rollers such as the roller 33 seen in FIG. 2. Each of the rollers 33 is journalled in a yoke 34, and guide wheels 35 bear upon the sides of the bands 32 to retain the tumbling drum in place. At one end of the tumbling drum is a ring sprocket 36 by means of which the drum is rotated by an electric motor 37 acting through a sprocket 38 and drive chain 39.

On the axis of the tumbling drum 31 is a liquid pipe 40 that is provided with a plurality of sets of liquid sprays 41, and a lower end of the pipe 40 is connected with a source of liquid, commonly water, as through an elbow 42.

Mounted on the pipe 40 are fixed radial arms 43 that carry baffle plates 44 in the lower part of the tumbling drum and longitudinal mixing beams 45 in the upper part of the drum.

Turning now to FIGS. 3 to 5, the prototype fluent solid material flow transducers 27 and 28 are seen to consist of a frame, indicated generally at 50, which includes a threaded, hollow mounting boss 51 which screws into the feed conduit 23 or the bypass feed conduit 24. On the mounting boss 51 is a bracket 52 having two jack screws 53 which bear against the conduit to relieve the boss 51 of most of the load of the transducer. A slotted frame support plate 54 is clamped to the bracket 52 by means of bolts 55 which are mounted in the slots of the support plate 54 to permit vertical adjustment of the support plate 54 relative to the mounting bracket 52.

Integral with the support plate 54 are horizontal support arms 56 which carry a mounting base 57 that forms the bottom of a load cell, indicated generally at 58. Surmounting the base 57 is a stabilizing diaphragm 59 upon the periphery of which is seated a lower load cell frame 60 which is, in turn, surmounted by a control diaphragm 61. Resting upon the perimeter of the control diaphragm 61 is an upper load cell frame 62, and the top of the load cell is closed by a plate 63 which seats upon a sealing gasket 64. The load cell is assembled by four long threaded bolts 65 which extend through the cover plate 63 and the base 57 and receive nuts 66. The threaded lower extremities of the bolts 65 extend through holes in lower plates 67a and 67b and receive retaining nuts 68 which clamp the load cell onto the support arms 56. Thus by loosening the retaining nuts 68 the load cell may be adjusted toward and away from the conduit.

A piston sub-assembly 69 is assembled so as to be fixedly secured and sealed to the stabilizing diaphragm 59 and the control diaphragm 61. The sub-assembly comprises a headed, threaded bolt 70 which extends through close-fitting, central holes in the two diaphragms 59 and 61. Upper metal discs 71a and 71b slidably surround the upper end of the bolt 70, sandwiching the control diaphragm 61; while lower metal discs 72a and 72b sandwich the stabilizing diaphragm 59. A spacer sleeve 73 fixes the space between the discs 71b and 72a, and the disc 72b is threaded to screw onto the bolt 70 and clamp the sub-assembly parts in their relatively fixed positions with the bolt 70 providing a piston rod which carries a yoke 74 at its lower end. The base 57 and the lower load cell frame 60 provide means securing the periphery of the stabilizing diaphragm 59 to a lower part of the load cell.

Extending through the load cell top plate 63 are an air inlet pipe 75, an air outlet pipe 76, and a bleed nozzle 77 which has an inner end 77a immediately adjacent the inner surface of the control diaphragm 61, which is actually defined by the head of the piston rod 70. The diaphragm 61 and piston 69, the upper load cell frame 62 and the top plate 63 with the gasket 64 define a sealed chamber 78. The relationship between the inner end 77a of the bleed nozzle 77 and the head of the piston rod 70 is such that when no material is passing through the feed conduit 23 all the air entering the sealed chamber 78 through the inlet pipe 75 may enter the bleed nozzle 77 through an orifice defined by the space between the inner end 77a of the nozzle and the head of the piston rod 70, and bleed to atmosphere through the bleed nozzle 77.

The lower load cell frame 60 has an air vent hole 60a so that the space defined by the stabilizing diaphragm 59, the lower load cell frame 60 and the control diaphragm 61 is open to the atmosphere.

A sensor member, indicated generally at 79, is mounted in the hollow mounting boss 51 in a sealed, effectively friction free pivot, indicated generally at 80. The pivot consists of an O-ring 81 and a plug of silicone adhesive 82 which surrounds the sensor member 79 between the O-ring and the inner surface of the conduit 23.

The sensor member 79 consists of a sensing arm 83 which extends into the conduit 23, and a force arm 84 which seats in the piston yoke 74. Secured to the lower plate 67a is a pair of bolts 85 which carry a spacer plate 86 and a pair of blocks 87 that closely confine the force arm 84 against lateral movement which would otherwise be possible by reason of the use of an O-ring pivot.

In operation, the impact of pulverulent material dropping through the conduit 23 or 24, as the case may be, pivots the sensor member 79 so that the force arm 84 moves the piston and control diaphragm to vary the bleed nozzle orifice and thus vary the pressure of air in the air outlet pipe 76. The total movement of the piston with the air flow rate used in the present device is no more than about 0.01 inch (0.25 mm). For such small motion there is no friction in the sealed pivot 80.

The sensing arm 83 is shown in FIG. 4 as extending about 83% of the way across the conduit 23; but this is by no means necessary because it is only the material that impacts a small part near the outer end 83a of the sensing arm that determines the position of the control diaphragm 61. This is because although material flow varies across the area of the conduit, the differences from place to place remain quite uniform, so total flow may be adequately determined by the flow in a small "sample" area in which the end portion of the sensing arm is located. Where this may be affects only the relative lengths of the sensing arm 83 and the force arm 84; and this can be compensated for by moving the load cell 58a in or out on the support arms 56.

Referring now to FIG. 2, the air inlet pipe 75 is connected by a tube 88 to a constant flow rate air source, while the air outlet pipe 76 is connected by a tube 89 to a commercially available device 90 for converting varying air pressures to electrical signals which act through control wires 91 to operate the power unit 25a for the feed valve 25 (or the power unit 26a for the bypass feed valve 26) and thus change the position of the butterfly valve 25 (or 26) as required to control the flow of material passing through the feed conduit 23 (or the bypass conduit 24). A suitable air flow rate in the tube 88 is 2 SCFH (0.0566.5 m³h).

The control box 90 may contain any of several different types of commercially available devices including, for example, a deadband three-point switch, an analog controller or an electronic transducer. The preferred device is a deadband three point switch sold by Dwyer Instruments, Inc. of Michigan City, Ind., as its PHOTOHELIC® SWITCH/GAGE Model 3050-RMR, which has a built-in air pressure gauge.

In a prototype of the system, the flow transducer 27, or 28, holds the flow rate of fly ash passing through the feed conduit 23, or the bypass feed conduit 24, within ±5% of a desired rate. This is a narrow enough variation to provide quite uniform moisture content of material fed out of the moistening chamber 29 through a discharge conduit 92, or to provide flow of dry material through a discharge conduit 93 which is sufficiently uniform to avoid overloading of a transport device such as a truck, in spite of the fact that there is about a three second lag between movement of the feed valve and the actual change of the rate of ash flow.

A desired rate of material flow may be selected, and the load cell 58 may be adjusted in or out on the support arms 56 to change the effective length of thow may be selected, and the load cell 58 may be adjusted in or out on the support arms 56 to change the effective length of the force arm 84. The adjustment permits the transducer to be used over a very wide range of fluid pressure - i.e., from as little as 1 inch H₂O up to several p.s.i. The load cell is adjusted so as to put the pressure gauge pointer at a preselected set point.

It is apparent that the flow transducer of the present invention may be used in any industrial application where it is necessary either to control the rate of flow of pulverulent material through a conduit, or where it is desired to record that rate of flow for any purpose. Accordingly, the transducer has a far wider range of industrial applications than the one system here taught as a typical use for the transducer. By proper adjustment the transducer may be used in connection with the movement of any fluent solid material as heretofore defined, in either an air conduit or a slurry conduit.

Referring now to FIGS. 6-8, a production embodiment of the transducer is indicated generally at 127. A frame, indicated generally at 150, includes a threaded hollow mounting boss 151, and on the mounting boss is a bracket 152 having two jack screws 153 which bear against the conduit to relieve the boss 151 of most of the load of the transducer. A pair of horizontal support arms 156 are threaded at 156a and extend through holes in the support plate 152 upon which they are secured by means of nuts 156b and 156c.

Carried upon the support arms 156 is a mounting base 157 that forms the bottom of a load cell, indicated generally at 158. Surmounting the base 157 is a stabilizing diaphragm 159 upon the periphery of which is seated a lower load cell frame 160 which is, in turn, surmounted by a control diaphragm 161. Resting upon the perimeter of the control diaphragm 161 is an upper load cell frame 162, and the top of the load cell is closed by a plate 163 which seats upon a sealing gasket 164. The load cell is assembled by four long bolts 165 which extend through the cover plate 163, through the base 157, through holes in lower plates 167a and 167b, and which receive retaining nuts 168 which clamp the load cell onto the support arms 156.

A piston subassembly, indicated generally at 169, is fixedly secured and sealed to the stabilizing diaphragm 159 and the control diaphragm 161. The subassembly comprises a rod 170 which is threaded at both ends and extends through close-fitting, central holes in the diaphragms 159 and 161. Upper metal discs 171a and 171b slidably surround the upper end of the threaded rod 170, sandwiching the control diaphragm 161; while lower metal discs 172a and 172b sandwich the stabilizing diaphragm 159. A spacer sleeve 173 fixes the space between the discs 171b and 172a, and the subassembly 169 is completed by an upper cap nut 174a and a lower cap nut 174b which screw onto the two threaded end portions of the rod 170. The base 157 and the lower load cell frame 160 provide means securing the periphery of the stabilizing diaphragm 159 to a lower part of the load cell.

Extending through the load cell top plate 163 are an air inlet pipe 175, an air outlet pipe 176, and a bleed nozzle 177 which has an inner end 177a immediately adjacent the top of the cap nut 174a, which actually defines the inner surface of the control diaphragm 161 for purposes of operation of the load cell. The outer end portion of the bleed nozzle 177 is provided with a very fine air filter (not shown) to prevent dust from entering a sealed chamber 178 which is defined by the diaphragm 161, the upper load cell frame 162 and the top plate 163 with the gasket 164.

The lower load cell frame 160 has an air vent hole 160a.

A sensor member 179 is like the sensor member 79, except that its outer end is threaded to receive a short threaded sleeve 179a. Nuts 185 screw onto the threaded outer ends of the support arms 156 to mount a guide plate 186 which has a slot 187 that closely confines the outer portion of the sensor member 79 against lateral movement which would otherwise be possible by reason of the pivotal arrangement for the sensor member.

In the production embodiment of the transducer, the hollow mounting boss 151 consists of a standard ¼-inch pipe nipple which is drilled from both ends to ⅜-inch, leaving a land 151a which assures proper positioning of an O-ring pivot 181. The hollow mounting boss 151 and the plate 152 are secured to one another by means of a lock nut 151b. There is a plug of silicone adhesive 182 as in the prototype.

The foregoing detailed description is given for clearness of understanding only, and no unnecessary limitations should be understood therefrom, as modifications will be obvious to those skilled in the art.

I claim:

1. A fluent solid material flow transducer comprising, in combination:
    a frame adapted to be mounted on the exterior of a conduit in a fluent solid material transporting system;
    a load cell in said frame, said load cell comprising a sealed chamber, means for passing air through said chamber at a constant flow rate, said means including an air inlet pipe, an air outlet pipe and a bleed nozzle having a small variable orifice, and linearly movable means for varying the orifice;
    an effectively friction free sealed pivot secured to said frame in a hole in the conduit;
    and a sensor member mounted on said pivot, said sensor member having a sensing arm extending into the conduit and a force arm outside the conduit for moving said linearly movable means, the relationship between the bleed nozzle orifice and the linearly movable means being such that when no pulverulent material is passing through the conduit, air from the chamber bleeds freely to atmosphere, while the impact of material on the sensing arm causes the force arm to move the linearly movable means to vary the bleed nozzle orifice in proportion to the volume of material passing through the conduit and thus vary the flow of air through the air outlet pipe.

2. The combination of claim 1 in which the frame includes a hollow mounting boss that extends into the hole in the conduit, and in which the sealed pivot is in the mounting boss.

3. The combination of claim 2 in which the frame also includes a bracket on the hollow mounting boss and support arms carried by said bracket which are effectively parallel to said boss.

4. The combination of claim 3 in which the sensor member is a one piece round rod.

5. The combination of claim 4 in which the sealed pivot comprises an O-ring and an adhesive seal surrounding the rod and abutting the O-ring.

6. The combination of claim 5 in which the linear movable means comprises a piston, a piston rod for the piston and a flexible control diaphragm which is sealed to the piston and defines a wall of the chamber.

7. The combination of claim 6 in which the control diaphragm is sealed into the piston, and a surface of the piston provides the inner suffice of the control diaphragm.

8. The combination of claim 6 in which the piston comprises a sub-assembly including a stabilizing diaphragm, the piston rod extends through the stabilizing diaphragm and the control diaphragm, and rigid members sandwiching the control diaphragm and the stabilizing diaphragm are fixed on the piston rod and space said diaphragms, and in which means secure the periphery of the stabilizing diaphragm to a lower part of the load cell.

9. The combination of claim 8 in which the piston rod is threaded at both ends, the rigid members comprise two upper discs sandwiching the control diaphragm, two lower discs sandwiching the stabilizing diaphragm, and a spacer sleeve on the rod between said upper and lower discs, and cap nuts on both threaded ends of the rod.

10. The combination of claim 1 in which the sensor member is a one piece round rod.

11. The combination of claim 10 in which the sealed pivot comprises an O-ring and an adhesive seal surrounding the rod and abutting the O-ring.

12. The combination of claim 11 in which the linear movable means comprises a piston, a piston rod for the piston and a flexible control diaphragm which is sealed to the piston and defines a wall of the chamber.

13. The combination of claim 12 in which the control diaphragm is sealed into the piston, and a surface of the piston provides the inner surface of the control diaphragm.

14. The combination of claim 12 in which the piston comprises a sub-assembly including a stabilizing diaphragm, the piston rod extends through the stabilizing diaphragm and the control diaphragm, and rigid members sandwiching the control diaphragm and the stabilizing diaphragm are fixed on the piston rod and space said diaphragms, and in which means secure the periphery of the stabilizing diaphragm to a lower part of the load cell.

15. The combination of claim 14 in which the piston rod is threaded at both ends, the rigid members comprise two upper discs sandwiching the control diaphragm, two lower discs sandwiching the stabilizing diaphragm, and a spacer sleeve on the rod between said upper and lower discs, and cap nuts on both threaded ends of the rod.

16. The combination of claim 1 in which the linear movable means comprises a piston, a piston rod for the piston and a flexible control diaphragm which is sealed to the piston and defines a wall of the chamber.

17. The combination of claim 16 in which the control diaphragm is sealed into the piston, and a surface of the piston provides the inner surface of the control diaphragm.

18. The combination of claim 16 in which the piston comprises a sub-assembly including a stabilizing diaphragm, the piston rod extends through the stabilizing diaphragm and the control diaphragm, and rigid members sandwiching the control diaphragm and the stabilizing diaphragm are fixed on the piston rod and space said diaphragms, and in which means secure the periphery of the stabilizing diaphragm to a lower part of the load cell.

19. The combination of claim 18 in which the piston rod is threaded at both ends, the rigid members comprise two upper discs sandwiching the control diaphragm, two lower discs sandwiching the stabilizing diaphragm, and a spacer sleeve on the rod between said upper and lower discs, and cap nuts on both threaded ends of the rod.

20. A fluent solid material flow transducer comprising, in combination:

a frame adapted to be mounted on the exterior of a conduit in a fluent solid material transporting system;

a load cell in said frame, said load cell comprising a sealed chamber, a resilient control diaphragm defining one side of said chamber, a piston for applying force to said control diaphragm, an air inlet pipe for admitting air to said chamber at a constant flow rate, an air outlet pipe communicating with the interior of said chamber, and a bleed nozzle that has an inner end immediately adjacent the inner surface of the control diaphragm to provide an orifice for said bleed nozzle the area of which is varied by movement of said control diaphragm;

an effectively friction free sealed pivot secured to said frame in a hole in the conduit;

and a sensor member mounted on said pivot, said sensor member having a sensing arm extending into the conduit and a force arm for moving the piston, the relationship between the bleed nozzle and the control diaphragm being such that when no pulverulent material is passing through the conduit, air from the sealed chamber bleeds freely to atmosphere, while the impact of material on the sensing arm causes the force arm to move the piston and control diaphraghm to vary the bleed nozzle orifice in proportion to the volume of material passing through the conduit and thus vary the flow of air through the air outlet pipe.

* * * * *